United States Patent [19]

Yabe et al.

[11] Patent Number: 5,266,244
[45] Date of Patent: Nov. 30, 1993

[54] METHOD OF FORMING A THIN ELECTROCONDUCTIVE FILM

[75] Inventors: Akira Yabe; Hiroyuki Niino, both of Ibaraki; Masashi Shimoyama, Tokyo, all of Japan

[73] Assignees: Ebara Corporation; Japan as Represented by Director General of Agency of Industrial Science and Technology, both of Tokyo, Japan

[21] Appl. No.: 867,202

[22] PCT Filed: Mar. 12, 1991

[86] PCT No.: PCT/JP91/00333
§ 371 Date: Jun. 30, 1992
§ 102(e) Date: Jun. 30, 1992

[87] PCT Pub. No.: WO91/13680
PCT Pub. Date: Sep. 19, 1991

[30] Foreign Application Priority Data

Mar. 12, 1990 [JP] Japan ................ 2-57982

[51] Int. Cl.$^5$ .................................. B29C 35/08
[52] U.S. Cl. .................................. 264/22; 264/101; 264/104; 425/174.4
[58] Field of Search ............ 264/22, 25, 1.4, 104–105, 264/340, 101; 252/51, 500; 425/174.4

[56] References Cited

U.S. PATENT DOCUMENTS

| | | | |
|---|---|---|---|
| 4,654,273 | 3/1987 | Gurgiolo et al. | 252/500 |
| 4,803,021 | 2/1989 | Werth et al. | 264/25 |
| 5,098,617 | 3/1992 | Schuster | 264/83 |
| 5,098,618 | 3/1992 | Zelez | 264/22 |

FOREIGN PATENT DOCUMENTS

| | | | |
|---|---|---|---|
| 3540411 | 5/1987 | Fed. Rep. of Germany | 264/25 |
| 61-204238 | 9/1986 | Japan | 264/22 |
| 61-215773 | 9/1986 | Japan | 264/22 |
| 2-55738 | 2/1990 | Japan | 264/22 |
| 3-529936 | 3/1991 | Japan | 264/22 |
| WO8905330 | 6/1989 | World Int. Prop. O. | 264/22 |

OTHER PUBLICATIONS

Proc. SPIE-Int. Soc. Opt. Eng. vol. 1022-1988, pp. 112-117; Decker C.: "Direct writing of microcircuits by laser-assisted processing of polymers".
ACS Symp. Ser. vol. 364, 198, pp. 201-218; Decker C.: "Photochemical modifications of poly-vinyl-chloride".
Synthetic Metals, 17 (1987)557-562, K. Akagi, et al. "One-Dimensional Conjugated Carbyne—Synthesis and Properties".
The third edition Chemical Handbook Applied Chapter, Compiled by the Chemical Society of Japan; p. 786.
American Chemical Society, 1988, pp. 201-218, Chapter 15, C. Decker, "Photochemical Modifications of Poly(vinyl chloride)—Conducting Polymers and Photostabilization".

(List continued on next page.)

*Primary Examiner*—Jeffery Thurlow
*Attorney, Agent, or Firm*—Oblon, Spivak, McClelland, Maier & Neustadt

[57] ABSTRACT

A thin electroconductive film is formed by irradiating a shaped article of chlorinated vinyl polymer with a pulsive light having a pulse duration of not greater than 100 nsec., a fluence of above about 15 mJ/cm$^2$/pulse and below that at which the polymer is subject to ablation, a laser wavelength of from about 190 to about 300 nm, and repetition frequency of above about 1 Hz and below that at which the polymer is subject to deformation and/or decomposition by a regenerative function of irradiation, under vacuum or in an oxygen-free atmosphere, thereby irradiating the article with total photon numbers of at least $1 \times 10^{18}$/cm$^2$ without causing photocrosslinking, oxidation or cleavage of the backbone chain. The invention does not use materials other than the starting polymer such as solvents or strong bases that can contaminate the thin film during a dehydrochlorination, so there is no need to remove solvents after reaction and no residual salts will be formed in the dehydrochlorination.

6 Claims, 1 Drawing Sheet

OTHER PUBLICATIONS

Journal of Polymer Science, vol. 14, 1447–1462 (1976), Jan F. Rabek, et al., "Studies on the Photooxidation Mechanism of Polymes. IV. Effect of Ultraviolet Light (2537 A) on Solid PVC Particles Suspended in Different Liquids".

Eur. Polym. J. vol. 20, No. 2, pp. 149–155, 1984, C. Decker, "Degradation of Poly(Vinyl Chloride) By u.v. Radiation–II".

Polymer Degradation and Stability 25 (1989), pp. 293–306, Jean-Luc Gardette, et al., "Wavelength Effects On The Disoloration And Oxidation of Poly(Vinyl Chloride)".

Journal of Photochemistry, 15 (1981), pp. 221–228, C. Decker, et al., "Laser-Induced Degration of Polyvinyl Chloride II: Oxygen Bleaching of Polyenes".

Chemistry Letters, pp. 917–920, 1988, Akihiko Ouchi, et al., "KrF Excimer Laser-inducted Dehydrochlorination of 1,2-Dichloropropane".

METHOD OF FORMING A THIN ELECTROCONDUCTIVE FILM

TECHNICAL FIELD

The present invention relates to a method of forming a thin electroconductive film, more particularly to a method of forming a thin electroconductive film from chlorinated vinyl polymers.

BACKGROUND ART

It is conventionally known that chlorinated vinyl polymers can be rendered electroconductive by being subjected to a dehydrochlorination to produce many long conjugated multiple bond chains therein. Specific methods of achieving this are as follows.

(a) Thermal Method

When a chlorinated vinyl polymer is heated, hydrogen chloride is vigorously released. To take polyvinyl chloride as an example, it melts at 170° C. and above and hydrogen chloride is vigorously released at 190° C. and above to form conjugated multiple bonds (see "Kagaku Binran Oyohen (Chemical Handbook—Applications)", p. 786, complied by The Chemical Society of Japan, published by Maruzen, 1980).

(b) Chemical Method

According to Synth. met., Vol. 17, 143 (1987), chlorinated polyvinyl chloride is submerged in a strong base solution of DUB (1,8-diazabicyclo[5.4.0]-7-undecene) and a dehydrochlorination is permitted to proceed ionically to form an electroconductive material.

(c) Photochemical Method

Light emitted from a mercury lamp and other sources of light in the ultraviolet wavelength region dissociate carbon-to-chlorine bonds in a chlorinated vinyl polymer and the resulting chlorine radicals extract adjacent hydrogen atoms to cause a dehydrochlorination.

According to a report in J. Polym. Sci., Polym. Letters, Vol. 25, 5 (1987), a chlorinated polyvinyl chloride was irradiated with a medium-pressure mercury lamp to produce chlorinated polyacetylene photochemically, followed by irradiation with an argon ion laser at 488.1 nm to prepare an electroconductive material.

As described above, various methods have been known for performing a dehydrochlorination to impart electroconductivity to chlorinated vinyl polymers. However, they have their own problems as summarized below. First, it is difficult to produce a uniformly thin film by the thermal method (a). In order to initiate a dehydrochlorination, the polymer must be heated to its softening point or a higher temperature in which case the polymer is subjected to deformation or other unavoidable deterioration occurs. In the chemical method (b), a strong base is used to initiate a dehydrochlorination and, as a result, a salt that is deleterious to electroconductivity is produced in the thin film formed but this salt is unremovable.

In the photochemical method (c), light emitted from a mercury lamp and other sources of light in the ultraviolet wavelength region initiate a dehydrochlorination in the chlorinated vinyl polymer but, at the same time, prolonged exposure to such light causes photocrosslinking and cleavage of the backbone chain. Further, exposure to light in the ultraviolet region in an oxygen-containing atmosphere will cause oxidation of the chlorinated vinyl polymer and subsequent cleavage of its backbone chain, resulting in the formation of carbonyl groups at the points of cleavage. Such photocrosslinking and cleavage of the backbone chain are side reactions that are unfavorable for the purpose of extending the conjugated multiple bond chains which are necessary to impart electroconductivity to the chlorinated vinyl polymer of interest.

J. Polym. Soc., Polym. Letters, Vol. 25, 5 (1987) mentioned under (c) "Photochemical Method" and PROC. SPIE-INT. Soc., OPT. ENG. Vol. 1022, 112–117 (1988) mentioned in the International Search Report describe techniques similar to the idea of the present invention but they differ from the present invention in terms of the wavelength of irradiation and the pulse duration. According to those prior art reports, conductivity is developed upon irradiation with continuous visible light (488.1 nm) from an argon ion laser. The reports also state the failure to develop conductivity by irradiation with a nitrogen laser emitting pulsed light at a wavelength of 337 nm.

DISCLOSURE OF INVENTION

It is an object of the present invention to provide a method of imparting electroconductivity to a shaped article of chlorinated vinyl polymer by forming a thin uniform electroconductive film through a dehydrochlorination that is performed without substantially causing photocrosslinking, oxidation or cleavage of the backbone chain.

Other objects and advantages of the present invention will become apparent to those skilled in the art from the following description and drawing.

BEST MODE FOR CARRYING OUT THE INVENTION

Figure 1:
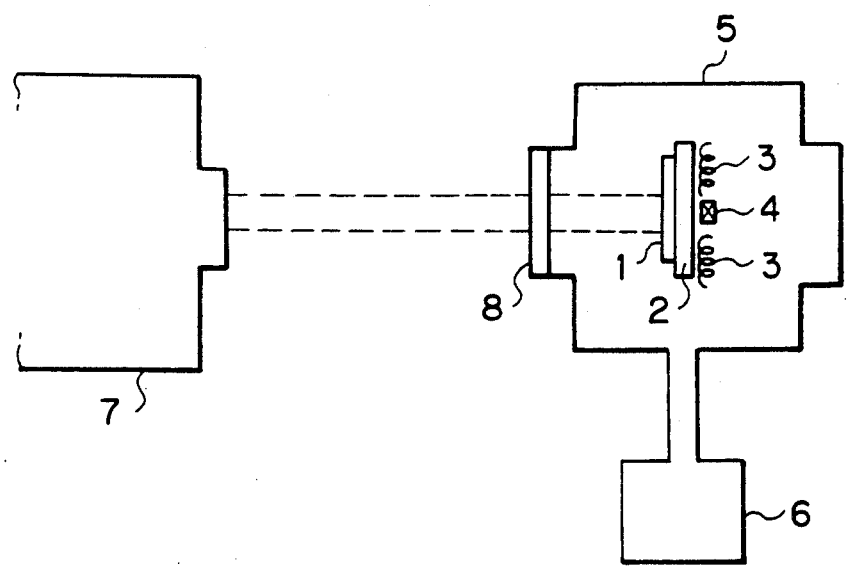
FIG. 1 is a schematic diagram showing an example of the apparatus that can be used to prepare a thin conductive film according to the present invention.

The present invention attains this object by irradiating a shaped article of chlorinated vinyl polymer with a pulsive light having a pulse duration of not greater than 100 nsec., a fluence of above about 15 mJ/cm$^2$/pulse and below that at which the polymer is subject to ablation, a laser wavelength of from about 190 to about 300 nm, and repetition frequency of above about 1 Hz and below that at which the polymer is subject to deformation and/or decomposition by a regenerative function of irradiation, under vacuum or in an oxygen-free atmosphere, thereby irradiating the article with total photon numbers of at least $1 \times 10^{18}$/cm$^2$, preferably $1 \times 10^{19}$ to $1 \times 10^{20}$/cm$^2$ in terms of operational efficiency and economy.

The chlorinated vinyl polymer that can be used advantageously in the method of the present invention is chlorinated polyvinyl chloride and/or polyvinylidene chloride. While the method of the present invention is applied to shaped products of chlorinated vinyl polymer, they may be in the form of a film, a sheet, a board, fibers, etc. According to the present invention, a thin electroconductive film is formed on the surface of those shaped products of chlorinated vinyl polymer. If the shaped product is a thin film, a thin electroconductive film can be produced.

Preferred sources of the pulse light that can be used in the present invention include excimer lasers using mixtures of rare gases and halogen gases (e.g. krypton fluoride), as well as flash lamps.

The reaction atmosphere may be air but for the purpose of imparting a higher level of electroconductivity to the chlorinated vinyl polymer, a vacuum or an oxygen-free atmosphere filled with an inert gas is preferred.

MECHANISM OF ACTION

The present inventors made comparative studies between a photochemical reaction conducted under a mercury lamp, a xenon lamp and other sources that emit continuous light, and a photochemical reaction conducted under an excimer laser and other sources of high-intensity pulsive light in the ultraviolet region. As a result, the present inventors found the occurrence of a characteristic reaction under exposure to pulsive light in the ultraviolet region.

According to the present invention, electroconductivity is obtained only in the areas irradiated with pulsive light in the specific conditions, so a thin conductive film that covers a large area or that is finely patterned or that is in any other form can be prepared merely by changing the method of irradiation.

In addition, the performance of a solid-phase reaction eliminates the use of materials other than the starting polymer such as solvents and strong bases that can contaminate the resulting thin film, so the method of the present invention is entirely free from the problems associated with the aforementioned chemical method (b) such as the need to remove solvents after reaction and the formation of residual salts by reaction.

Further, the starting polymer is not heated to its softening point or higher temperatures during the reaction, so a thin uniform film can be prepared without any deformation or other deterioration that occur in the aforementioned thermal method (a).

EXAMPLES

The following examples are provided for the purpose of further illustrating the present invention but are in no way to be taken as limiting.

EXAMPLE 1

Chlorinated polyvinyl chloride was used as a starting chlorinated vinyl polymer. A powder of polyvinyl chloride with 63% Cl added was dissolved in methylene chloride and cast to form a film having a thickness of ca. 50 μm. The film was subjected to a photochemical reaction in the following manner.

FIG. 1 is a diagram showing schematically the apparatus used to implement the method of the present invention. The chlorinated polyvinyl chloride film 1 prepared by the method described above was placed on a stage 2 and a heater 3 on the stage 2 was energized with the film temperature being controlled by monitoring with a sensor 4. A vacuum pump 6 was connected to the chamber 5 to create a vacuum reaction atmosphere in the chamber.

A KrF excimer laser 7 was used as a source of pulsive light. The light emitted from the laser 7 was admitted into the chamber 5 through a quartz window 8 so that it would illuminate the film 1.

The reaction conditions are summarized below.

| | |
|---|---|
| Starting material: | chlorinated polyvinyl chloride (63% chlorination) |
| Temperature of the starting material: | 90° C. |
| Atmosphere in the chamber: | high vacuum at $3 \times 10^{-7}$ Torr |
| Light source: | KrF excimer laser |
| Operating wavelength: | 248 nm |
| Fluence: | 15 mJ/cm$^2$/pulse |
| Repetition frequency: | 1 Hz |
| Total number of pulses applied: | 7640 |
| Pulse duration: | 20 nsec. |
| Total photon numbers: | $7 \times 10^{19}$/cm$^2$ |

The starting polymer irradiated under these conditions was named sample A.

EXAMPLE 2

A photochemical reaction was performed on the same starting material at the same temperature as in Example 1, except that the atmosphere in the chamber for preparing a thin conductive film was nitrogen gas at a pressure of one atmosphere.

The reaction conditions are summarized below.

| | |
|---|---|
| Starting material: | chlorinated polyvinyl chloride (63% chlorination) |
| Temperature of the starting material: | 90° C. |
| Atmosphere in the chamber: | N$_2$ at one atmosphere |
| Light source: | KrF excimer laser |
| Operating wavelength: | 248 nm |
| Fluence: | 30 mJ/cm$^2$/pulse |
| Repetition frequency: | 1 Hz |
| Total number of pulses applied: | 1800 |
| Pulse duration: | 20 nsec. |
| Total photon numbers: | $7 \times 10^{19}$/cm$^2$ |

The starting polymer irradiated under these conditions was named sample B.

COMPARATIVE EXAMPLE 1

A photochemical reaction was performed on the same starting material at the same temperature in the same atmosphere as in Example 1, except that a low-pressure mercury lamp was used as a light source. The starting polymer irradiated under these conditions was named sample C.

| | |
|---|---|
| Light sources: | low-pressure mercury lamp |
| Wavelength: | 254 nm |
| Light intensity: | 1 mW/cm$^2$ |
| Total exposure time: | 634 min |
| Continuous wave | |

Samples A and B prepared in accordance with the present invention were found to have resistances of about 5-30 kilo-ohms as measured across the opposite sides of a 1-cm square pattern of the irradiated area. Since the layer modified by irradiation was found to have a thickness of about 5 micrometers under examination of its cross-section with an optical microscope, the two samples were determined to have volume conductivities of about 0.1-1 siemens/cm. The sheet resistance of comparative sample C was more than 300 megohms and defied more exact measurement.

INDUSTRIAL APPLICABILITY

The advantages of the present invention can be summarized as follows.

(a) The use of a pulsive light having a pulse duration of not greater than 100 nsec. and a laser wavelength of from about 190 to about 300 nm reduces the chance of photocrosslinking and cleavage of the backbone chain of a starting chlorinated vinyl polymer.

(b) Irradiation in an oxygen-free atmosphere prevents oxidation and subsequent cleavage of the backbone chain.

(c) The invention does not use materials other than the starting polymer such as solvents and strong bases that can contaminate the thin film during a dehydrochlorination, so there is no need to remove solvents after reaction and no residual salts will form by the reaction.

(d) The starting polymer is not heated to its softening point or higher temperatures during the reaction, so a thin uniform film can be prepared without any deformation or other deterioration.

(e) Electroconductivity is obtained only in the areas irradiated with a pulsive light having a pulse duration of not greater than 100 nsec. and a laser wavelength of from about 190 to about 300 nm, so a thin conductive film that covers a large area or that is finely patterned or that is in any other form can be prepared merely by changing the method of irradiation.

We claim:

1. A method of forming a thin electroconductive film by irradiating a shaped article made of a chlorinated vinyl polymer with a pulsive light having a pulse duration of not greater than 100 nsec., a fluence of above about 15 mJ/cm$^2$ and below that at which the polymer is subject to ablation, a laser wavelength of from about 190 to about 300 nm, and repetition frequency of above about 1 Hz and below that at which the polymer is subject to deformation and/or decomposition by a regenerative function of irradiation, under vacuum or in an oxygen-free atmosphere, thereby irradiating the article with total photon numbers of at least $1 \times 10^{18}$/cm$^2$ such that the electroconductive film is not contaminated during a dehydrochlorination process.

2. A method of forming a thin electroconductive film by irradiating a shaped article made of a chlorinated vinyl polymer with a KrF excimer laser having a fluence of about 15 to about 30 mJ/cm$^2$ pulse, and repetition frequency of above and below that at which the polymer is subject to deformation and/or decomposition by a regenerative function of irradiation, under vacuum or in an oxygen-free atmosphere, thereby irradiating the article with total photon numbers of from about $1 \times 10^{19}$ to $1 \times 10^{20}$/cm$^2$ such that the electroconductive film is not contaminated during a dehydrochlorination process.

3. A method according to claim 1 wherein said chlorinated vinyl polymer is selected from the group consisting of chlorinated polyvinyl chloride, polyvinylidene chloride and a mixture thereof.

4. The method of forming a thin electroconductive film according to claim 1, further comprising means for monitoring the temperature of said shaped article during irradiation with said pulsive light.

5. The method of forming a thin electroconductive film according to claim 4, wherein said polymer is not heated to its softening point or higher temperatures during said irradiation with said pulsive light and therefore a thin uniform film can be prepared having no deformation or deterioration.

6. The method of forming a thin electroconductive film according to claim 1, wherein said shaped article is located within a sealed chamber connected to a vacuum pump for creating a vacuum atmosphere during said irradiation with said pulsive light.

* * * * *